(12) United States Patent
Rothberg

(10) Patent No.: US 6,996,501 B1
(45) Date of Patent: Feb. 7, 2006

(54) DISK DRIVE EXECUTING A MANUFACTURING PROGRAM INTERNALLY BY EXECUTING DISK COMMANDS THROUGH A VECTOR

(75) Inventor: Michael S. Rothberg, Foothill Ranch, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 140 days.

(21) Appl. No.: 10/329,161

(22) Filed: Dec. 24, 2002

(51) Int. Cl.
*G06F 11/00* (2006.01)

(52) U.S. Cl. .......................................... 702/186; 710/74
(58) Field of Classification Search ................. 702/186, 702/57, 58, 118, 119, 120, 183, 188, 189; 710/36, 50, 74
See application file for complete search history.

(56) References Cited

U.S. PATENT DOCUMENTS

| | | | |
|---|---|---|---|
| 4,268,905 A | | 5/1981 | Johann et al. |
| 5,764,545 A | | 6/1998 | Cannata et al. |
| 6,006,029 A | * | 12/1999 | Bianchi et al. ................ 703/24 |
| 6,101,227 A | * | 8/2000 | Glover ........................ 375/341 |
| 6,282,501 B1 | | 8/2001 | Assouad |
| 6,289,397 B1 | | 9/2001 | Tsuyuguchi et al. |
| 6,694,381 B1 | * | 2/2004 | Lo et al. .......................... 710/5 |
| 6,721,906 B1 | * | 4/2004 | Hirashita et al. .............. 714/54 |

* cited by examiner

*Primary Examiner*—Edward Raymond
(74) *Attorney, Agent, or Firm*—Milad G. Shara, Esq.; Won Tae C. Kim, Esq.; Howard H. Sheerin, Esq.

(57) ABSTRACT

A disk drive is disclosed for executing a drive operating program and a manufacturing program during a manufacturing process. An external test system executes a test program comprising platform independent executable code segments and host interface executable code segments. The external test system for executing the host interface executable code segments to send disk commands to a development drive. The manufacturing program comprises the platform independent executable code segments of the test program and disk access executable code segments. The drive operating program comprises a disk access procedure for processing disk commands and a disk access vector for calling the disk access procedure. The disk access executable code segments of the manufacturing program execute disk commands by calling the disk access procedure of the drive operating program through the disk access vector.

30 Claims, 9 Drawing Sheets

VECTOR TABLE

| VECT # | NAME | INPUT | OUTPUT | DESCRIPTION |
|---|---|---|---|---|
| - | VERSION | NOT A FUNCTION | | VERSION OF THIS DATA STRUCTURE |
| - | INPUT PARAMATER POINTER | NOT A FUNCTION | | POINTS TO THE INPUT PARAMETER LIST FROM THE SCT |
| 1 | VSC COMMAND REQUEST | POINTER TO VSCD | ERROR CODE | INITIATES A VSC COMMAND REQUEST |
| 2 | SUSPEND FOR COMPLETION | OPTION TO SUSPEND ON TONE SCAN DATA | SUSPEND MASK | OS SUSPEND UNTIL ONE OF PENDING EVENTS IS TRUE |
| 3 | PTM STATUS UPDATE | POINTER TO PTM STATUS DATA | NONE | UPDATE THE INFO IN THE STATUS BLOCK OF THE VSCD STATUS |

FIG. 6

VSC DESCRIPTOR

| NAME | DESCRIPTION |
|---|---|
| FORMAT VERSION | VERSION NUMBER OF THE DATA STRUCTURE |
| *INPUT FIELDS* | |
| CONTROL FLAGS | INTERFACE (3): ATA OR INTERNAL REQUESTER (3): HOST OR INTERNAL |
| POINTER TO KEY BUFFER | POINTER TO BUFFER WITH THE REQUESTING KEY |
| POINTER TO DATA BUFFER | IF VSC COMMAND, POINTER TO BUFFER FOR INPUT OR OUTPUT DATA; IF VSC STATUS REQUEST, POINTER TO BUFFER TO STORE VSC STATUS DATA |
| DATA BUFFER SIZE | SIZE OF DATA BUFFER IN SECTORS |
| *OUTUPT FIELDS* | |
| ERROR CODE | ERROR CODE FOR VSC COMMAND |
| COMPLETION COUNT | NUMBER OF SECTORS/WEDGES READ/WRITTEN |
| SERVO RETRIES | NUMBER OF NON-FATAL SEEK ERRORS OF SEEK |

FIG. 7

SEQUENCE CONTROL TABLE

| NAME | DESCRIPTION |
|---|---|
| FILE HEADER | STANDARD 24-BYTE FILE HEADER |
| TEST POINTER | THE TEST TO BE INITIATED |
| TRB SIZE | SIZE OF THE TEST REQUEST BLOCK IN BYTES |
| *TEST REQUEST BLOCK #1* | |
| PTM ID | FILE ID OF PTM FILE |
| TEST ID | VECTOR NUMBER OF TEST TO EXECUTE |
| INPUT PARAMS 1 | TEST-SPECIFIC INPUT TO TEST BEING EXECUTED |
| . . . | . . . |
| INPUT PARAMS 16 | TEST-SPECIFIC INPUT TO TEST BEING EXECUTED |
| FLAGS | BIT 0: 0 = PROCEED DIRECTLY TO NEXT TEST; 1 = WARM START BEFORE STARTING NEXT TEST |
| GOTO ON PASS | NEXT TRB TO EXECUTE IF THIS TEST PASSES |
| GOTO ON FAIL | NEXT TRB TO EXECUTE IF THIS TEST FAILS |
| GOTO ON TIME | NEXT TRB TO EXECUTE IF THIS TEST TIMES OUT |
| TIMER | MAX SECONDS TO ALLOW TEST TO EXECUTE |
| EXTENDED ERROR CODE | RETURNED BY PTM TEST |
| CURRENT COMMAND | LAST PTM COMMAND ISSUED<br>0x0XXX = VSC ACTION<br>0X10XX = ATA COMMAND<br>0X20XX = SMART SUBCOMMAND |
| PTM STATUS | LAST STATUS REPORTED BY PTM |
| *TEST REQUEST BLOCK #2* | |
| TRB BLOCK #2 | SAME FORMAT AS TRB #1 |
| . . . | . . . |
| TRB BLOCK #N | SAME FORMAT AS TRB #N |

FIG. 8

DISK DRIVE EXECUTING A MANUFACTURING PROGRAM INTERNALLY BY EXECUTING DISK COMMANDS THROUGH A VECTOR

CROSS REFERENCE TO RELATED APPLICATIONS AND PATENTS

This application is related to co-pending U.S. Patent Application Ser. No. 10/329,167 entitled "A DISK DRIVE EXECUTING A PREEMPTIVE MULTITASKING OPERATING SYSTEM COMPRISING TASKS OF VARYING PRIORITY" filed on Dec. 24, 2002, co-pending U.S. patent application Ser. No. 10/183,207 entitled "DISK DRIVE AND METHOD FOR IMPLEMENTING NONSTANDARD DISK-DRIVE COMMANDS ON A SERIAL ATA INTERFACE THAT ONLY SUPPORTS STANDARD ATA DISK-DRIVE COMMANDS" filed on Jun. 26, 2002, and co-pending U.S. patent application Ser. No. 10/232,638 entitled "DISK DRIVE AND METHOD FOR DATA TRANSFER INITIATED BY NONSTANDARD DISK-DRIVE COMMANDS ON A SERIAL ATA INTERFACE THAT ONLY SUPPORTS STANDARD ATA DISK-DRIVE COMMANDS" filed on Aug. 30, 2002, the disclosures of which are incorporated herein by reference.

BACKGROUND OF THE INVENTION

1. Field of the Invention

The present invention relates to disk drives. More particularly, the present invention relates to a disk drive executing a manufacturing program internally by executing disk commands through a vector.

2. Description of the Prior Art

A disk drive may be designed to process vendor specific commands (VSC) used by vendors (such as disk drive manufactures) to test and configure the disk drive during manufacturing. In the past, the manufacturing program was developed using a programming language (e.g., assembly, C or Cow) and executed by an external test system known as a single plug tester (SPT) communicating with the disk drive over a host interface. In order to increase the manufacturing throughput, the number of SPTs must be increased which is expensive due to the "intelligent" circuitry employed within each SPT.

U.S. Pat. No. 5,282,501 discloses a disk drive which executes a test program internally thereby avoiding the expense of an external test system. However, the test program executed within the disk drive comprises a sequence of standard read/write commands similar to the commands sent by a host system. It would be impractical to implement many of the manufacturing programs using read/write macros as disclosed by the '501 patent. For example, it would be impractical to implement the defect scan which scans the disk for defective sectors and logs pertinent statistical data in an initial burn in (IBI) log stored in a system file on the disk. The IBI log is then used to create a defect list for mapping defective sectors to spare sectors.

There is, therefore, a need to execute manufacturing programs for a disk drive while avoiding the expense of external test systems.

SUMMARY OF THE INVETION

The present invention may be regarded as a disk drive for executing a drive operating program and a manufacturing program during a manufacturing process of the disk drive. An external test system executes a test program comprising platform independent executable code segments and host interface executable code segments, wherein the external test system executes the host interface executable code segments to send disk commands to a development drive. The manufacturing program comprises the platform independent executable code segments of the test program and disk access executable code segments. The drive operating program comprises a disk access procedure for processing disk commands and a disk access vector for calling the disk access procedure. The disk drive comprises a disk, a head actuated radially over the disk, a host interface for receiving disk commands from a host system, and a semiconductor memory for storing the drive operating program and the manufacturing program. A disk controller executes disk commands received over the host interface from the host system by calling the disk access procedure of the drive operating program. The disk controller also executes the platform independent executable code segments of the manufacturing program, wherein the disk access executable code segments of the manufacturing program execute disk commands by calling the disk access procedure of the drive operating program through the disk access vector.

In one embodiment, the development drive comprises a disk drive. In an alternative embodiment, the development drive comprises a program emulating a disk drive.

In one embodiment, the manufacturing program is stored in a non-volatile semiconductor memory. In one embodiment, the manufacturing program is stored on the disk of the disk drive. In yet another embodiment, a host system downloads the manufacturing program to the disk drive. In one embodiment, a host system sends a host command to the disk drive to begin executing the manufacturing program. In one embodiment, the host system sends at least one input parameter with the host command to the disk drive to begin executing the manufacturing program, wherein the manufacturing program is responsive to the at least one input parameter.

In one embodiment, the drive operating program transmits a status data structure to the host system, the status data structure representing an execution status of the manufacturing program.

In one embodiment, a compiler compiles program source code to generate the test program and the manufacturing program. The program source code comprises platform independent source code segments for implementing the platform independent executable code segments. The program source code further comprises host interface source code segments for implementing the host interface executable code segments, and disk access source code segments for implementing the disk access executable code segments. The program source code comprises a compiler directive for selecting between the host interface source code segments when compiling the program source code to generate the test program and the disk access source code segments when compiling the program source code to generate the manufacturing program.

In yet another embodiment, the drive operating program comprises a preemptive multitasking drive operating program comprising tasks having varying priority levels. The tasks comprising at least a host task for receiving the disk commands from the host system through the host interface, a background task for executing the manufacturing program, and an execution task for arbitrating and executing disk commands received from the host task and the background task. In one embodiment, the execution task gives priority to disk commands received from the host task over disk commands received from the background task.

In yet another embodiment, the drive operating program comprises a status update procedure for updating a status data structure associated with the manufacturing program and a status update vector for calling the status update procedure. The manufacturing program updates the status data structure by calling the status update procedure through the status update vector, and the status data structure is transmitted to the host system over the host interface.

In another embodiment, the drive operating program comprises a suspend for completion procedure for suspending the manufacturing program until the drive operating program finishes processing a current disk command. The drive operating program comprises a suspend for completion vector for calling the suspend for completion procedure. The manufacturing program performs data processing for a previous disk command concurrent with the drive operating program executing the current disk command. After finishing the data processing for the previous disk command, the manufacturing program calls the suspend for completion procedure through the suspend for completion vector. When the suspend for completion procedure returns to the manufacturing program, the manufacturing program executes a next disk command by calling the disk access procedure of the drive operating program through the disk access vector.

In still another embodiment, the manufacturing program comprises a plurality of executable files stored on the disk and a sequence control table comprising control data for selecting and executing the executable files.

In one embodiment, the platform independent executable code segments execute a defect scan of the disk, maintains statistical data related to the defect scan, and stores the statistical data in a disk file. In one embodiment, the test program maintains the statistical data related to the defect scan when executed by the external test system and stores the statistical data in a disk file of the development drive, whereas the manufacturing program maintains the statistical data related to the defect scan when executed by the disk controller and stores the statistical data in a disk file of the disk drive.

The present invention may also be regarded as a method of manufacturing a disk drive. The disk drive comprising a disk, a head actuated radially over the disk, a host interface for receiving disk commands from a host system, and a semiconductor memory for storing a drive operating program and a manufacturing program. The manufacturing program comprises platform independent executable code segments and disk access executable code segments. The drive operating program comprising a disk access procedure for processing disk commands and a disk access vector for calling the disk access procedure. The manufacturing program is developed on an external test system by initiating a test program comprising the platform independent executable code segments of the manufacturing program and host interface executable code segments. The external test system executes the platform independent executable code segments and the host interface executable code segments to send disk commands to a development drive. The manufacturing program is executed on the disk drive by executing the platform independent executable code segments of the manufacturing program, and executing the disk access executable code segments of the manufacturing program to execute disk commands by calling the disk access procedure of the drive operating program through the disk access vector.

The present invention may also be regarded as a disk drive for executing a drive operating program and a manufacturing program during a manufacturing process of the disk drive. The disk drive comprises a disk, a head actuated radially over the disk, a host interface for receiving disk commands from a host system, and a semiconductor memory for storing executable code segments of the drive operating program and executable code segments of the manufacturing program. A disk controller executes the executable code segments of the drive operating program and the executable code segments of the manufacturing program. The drive operating program comprises a disk access procedure for processing disk commands received over the host interface from the host system and a disk access vector for calling the disk access procedure. The manufacturing program executes disk commands by calling the disk access procedure through the disk access vector.

BRIEF DESCRIPTION OF THE DRAWINGS

FIG. 6 shows a vector table according to an embodiment of the present invention comprising a plurality of vectors called by the manufacturing program in order to interface with the drive operating program.

FIG. 7 shows an embodiment wherein a vendor specific command descriptor (VSCD) is employed by the manufacturing program to execute disk commands by calling the disk access procedure of the drive operating program through the disk access vector in FIG. 6.

FIG. 8 shows an embodiment wherein a sequence control table comprising control data is used to select and execute the executable files of the manufacturing program.

DESCRIPTION OF THEE PREFERRED EMBODIMENTS

Figure 1A:
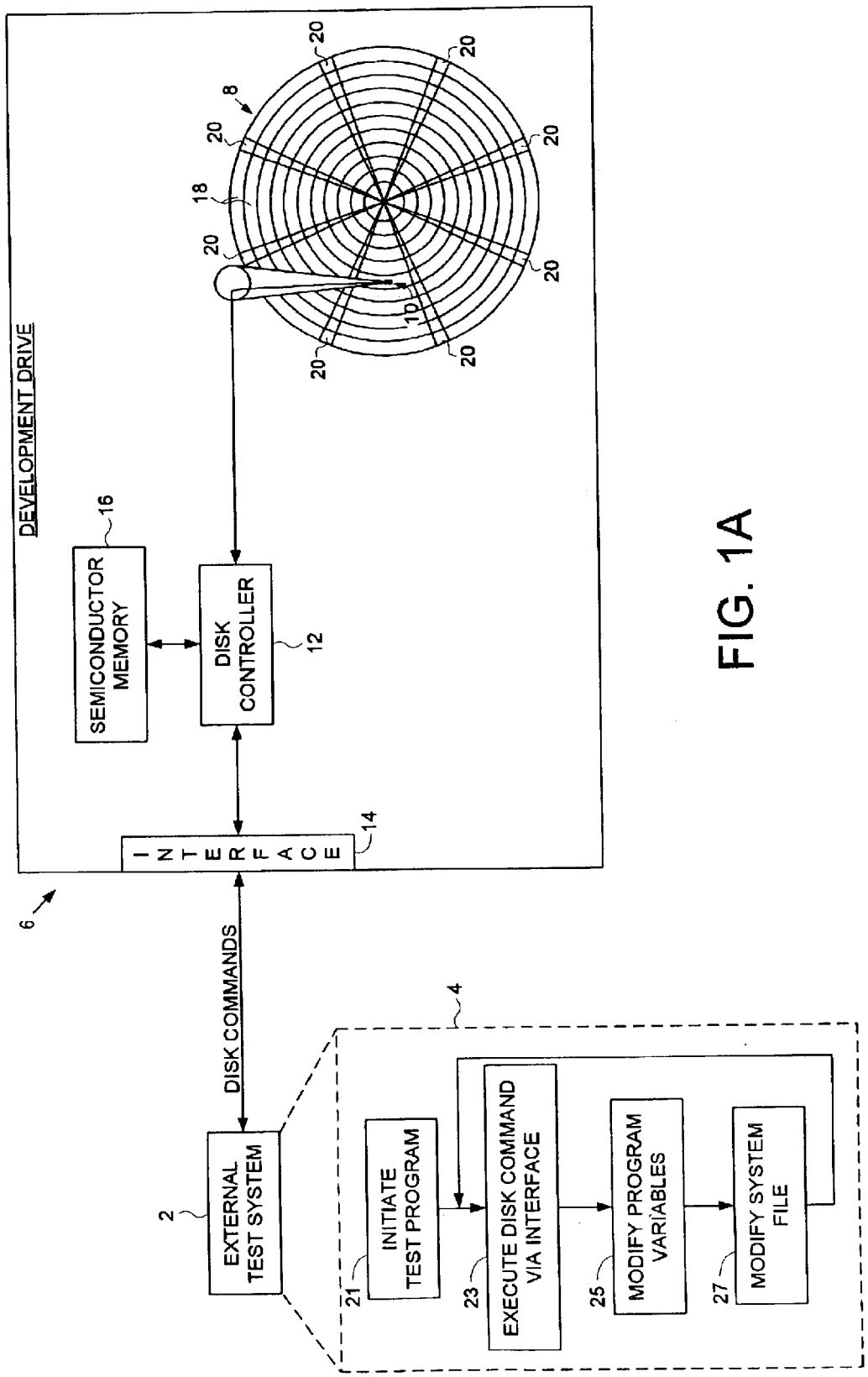
FIG. 1A shows an external test system for executing a test program by sending disk access commands to a development disk drive according to an embodiment of the present invention.

FIG. 1A shows an embodiment of the present invention wherein an external test system 2 executes a test program 4 comprising platform independent executable code segments and host interface executable code segments. The external test system 2 initiates the test program at step 21 for executing a manufacturing procedure (e.g., a defect scan). At step 23, the test program 4 sends a disk command to a development drive 6 by executing the host interface executable code segments. At step 25 the test program 4 modifies program variables associated with the manufacturing procedure, and at step 27 the test program 4 modifies a system file of the development drive 6 (e.g., an IBI log) associated with the manufacturing procedure.

In the embodiment of FIG. 1A, the development drive 6 is a disk drive comprising a disk 8, a head 10 actuated radially over the disk 8, a disk controller 12 for processing the disk commands received from the external test system 2 over a host interface 14, and a semiconductor memory 16 for storing a drive operating program executed by the disk controller 12. Any suitable development drive 6 may be employed, including a disk drive as illustrated in FIG. 1A. In an alternative embodiment, the development drive 6 comprises software and/or hardware for emulating a disk drive. For example, in one embodiment the development drive 6 is implemented as a program running on the external test system 2 which emulates a disk drive.

The disk 8 in the embodiment of FIG. 1A comprises a plurality of radially spaced, concentric tracks 18, wherein each track 18 comprises a plurality of data sectors and a plurality of embedded servo sectors 20. The embedded servo sectors 20 comprise head positioning information for positioning the head 10 over a target track.

Figure 1B:
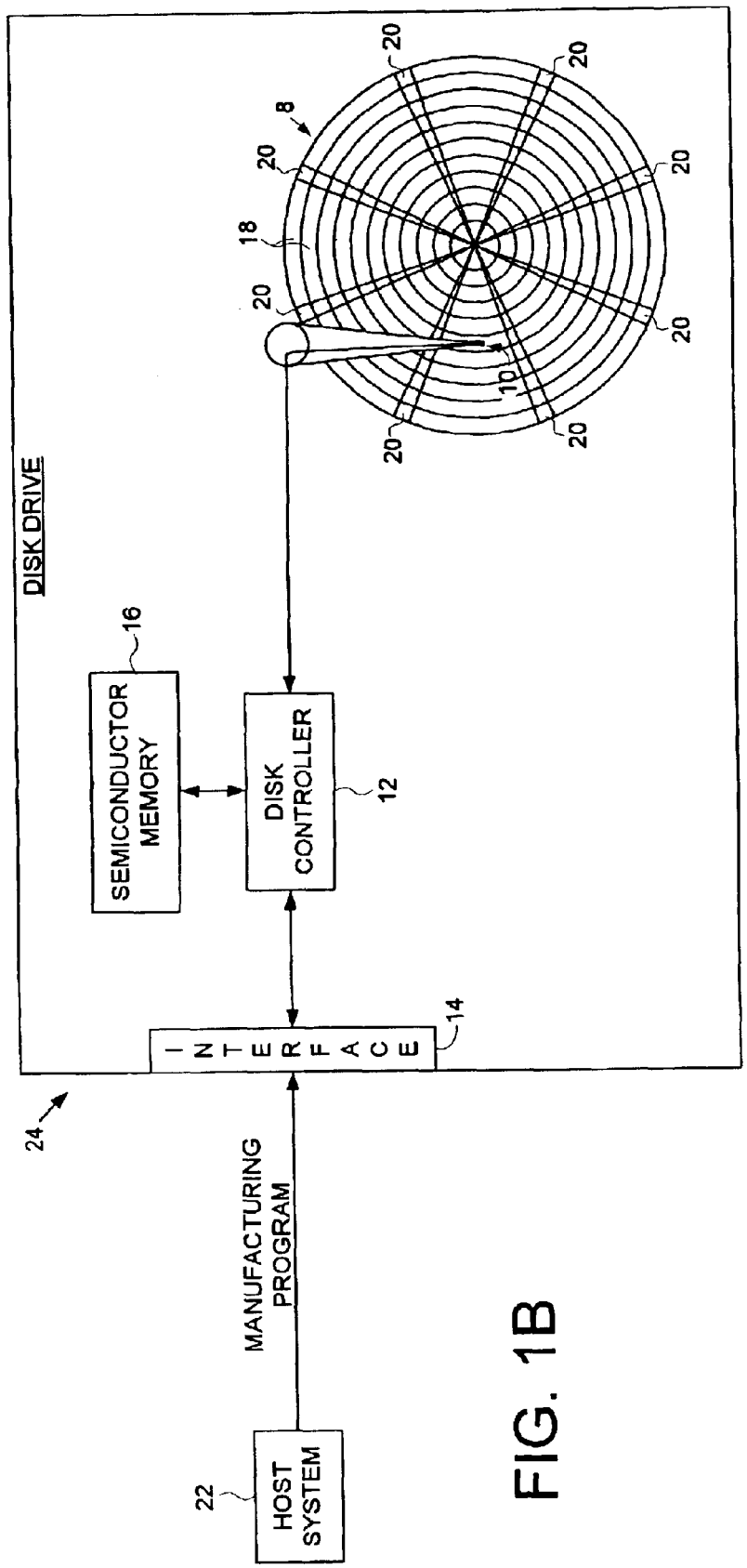
FIG. 1B shows a host system downloading a manufacturing program generated from the test program to a disk drive according to another embodiment of the present invention.

FIG. 1B illustrates an embodiment of the present invention wherein a host system 22 downloads a manufacturing program to a disk drive 24. The disk drive 24 comprises a disk 8, a head 10 actuated radially over the disk 8, a host interface 14 for receiving disk commands from a host system, and a semiconductor memory 16 for storing the drive operating program and the manufacturing program. The manufacturing program comprises the platform independent executable code segments of the test program 4 and disk access executable code segments. The drive operating program comprising a disk access procedure for processing disk commands and a disk access vector for calling the disk access procedure. Any suitable technique (e.g., software interrupt, application programming interface, jump table, etc.) may be employed for implementing the disk access vector to provide indirect access to the disk access procedure.

In one embodiment, the manufacturing program is stored in a non-volatile semiconductor memory within the disk drive, and in another embodiment the manufacturing program is stored on the disk 8 and loaded into the semiconductor memory 16 when executed by the disk controller 12. The manufacturing program may be installed into the disk drive 24 in any suitable manner, including through an interface different from the host interface 14. In another embodiment, the manufacturing program is programmed into a non-volatile semiconductor memory which is installed into the disk drive 24 during manufacturing.

Figure 1C:
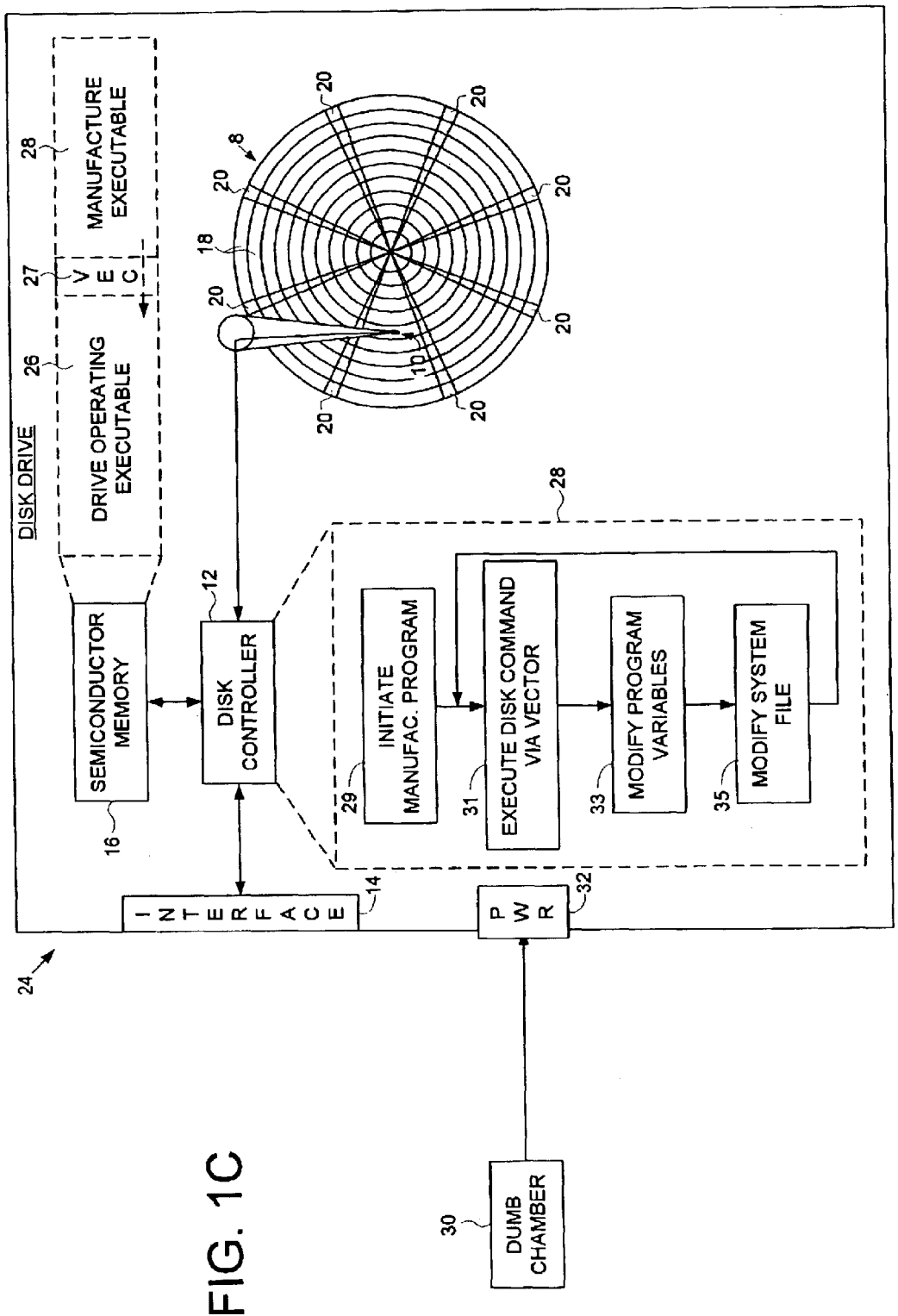
FIG. 1C shows a disk drive according to an embodiment of the present invention for executing a drive operating program and the manufacturing program, wherein the manufacturing program executes disk access commands by calling a disk access procedure of the drive operating program through a disk access vector.

FIG. 1C shows the disk controller 12 executing the drive operating program 26 comprising the disk access vector 27 and the manufacturing program 28. Disk commands received over the host interface 14 from a host system are executed by the disk controller 12 by calling the disk access procedure of the drive operating program 26. The disk controller 12 also executes the platform independent executable code segments of the manufacturing program 28, wherein the disk access executable code segments of the manufacturing program 28 execute disk commands by calling the disk access procedure of the drive operating program 26 through the disk access vector 27. At step 29 the disk controller 12 initiates the manufacturing program 28 to perform a manufacturing procedure (e.g., the defect scan). At step 31 the manufacturing program 28 executes a disk command via the disk access vector 27 of the drive operating program 26. At step 33 the manufacturing program 28 modifies variables associated with the manufacturing procedure, and at step 35 the manufacturing program modifies a system file of the disk drive 24 (e.g., an IBI log) associated with the manufacturing procedure.

In the embodiment of FIG. 1C, the disk drive 24 is installed into a dumb chamber 30 during the manufacturing process. The dumb chamber 30 provides power to the disk drive 24 over a power interface 32 which allows the disk drive 24 to execute the manufacturing program 28 internally. This avoids using the single plug tester (SPT) employed in the prior art which requires expensive processing circuitry for executing the manufacturing program and communicating with the disk drive 24.

The disk drive 24 may initiate the manufacturing program 28 in any suitable manner. In one embodiment, a host system sends a host command to the disk drive 24 to begin executing the manufacturing program 28. In one embodiment the host command includes at least one input parameter for configuring the manufacturing program 28. In another embodiment, the disk drive 24 is configured (e.g., using jumpers or by a host system) so that during a next power-on cycle the manufacturing program 28 is automatically executed.

Figure 2:
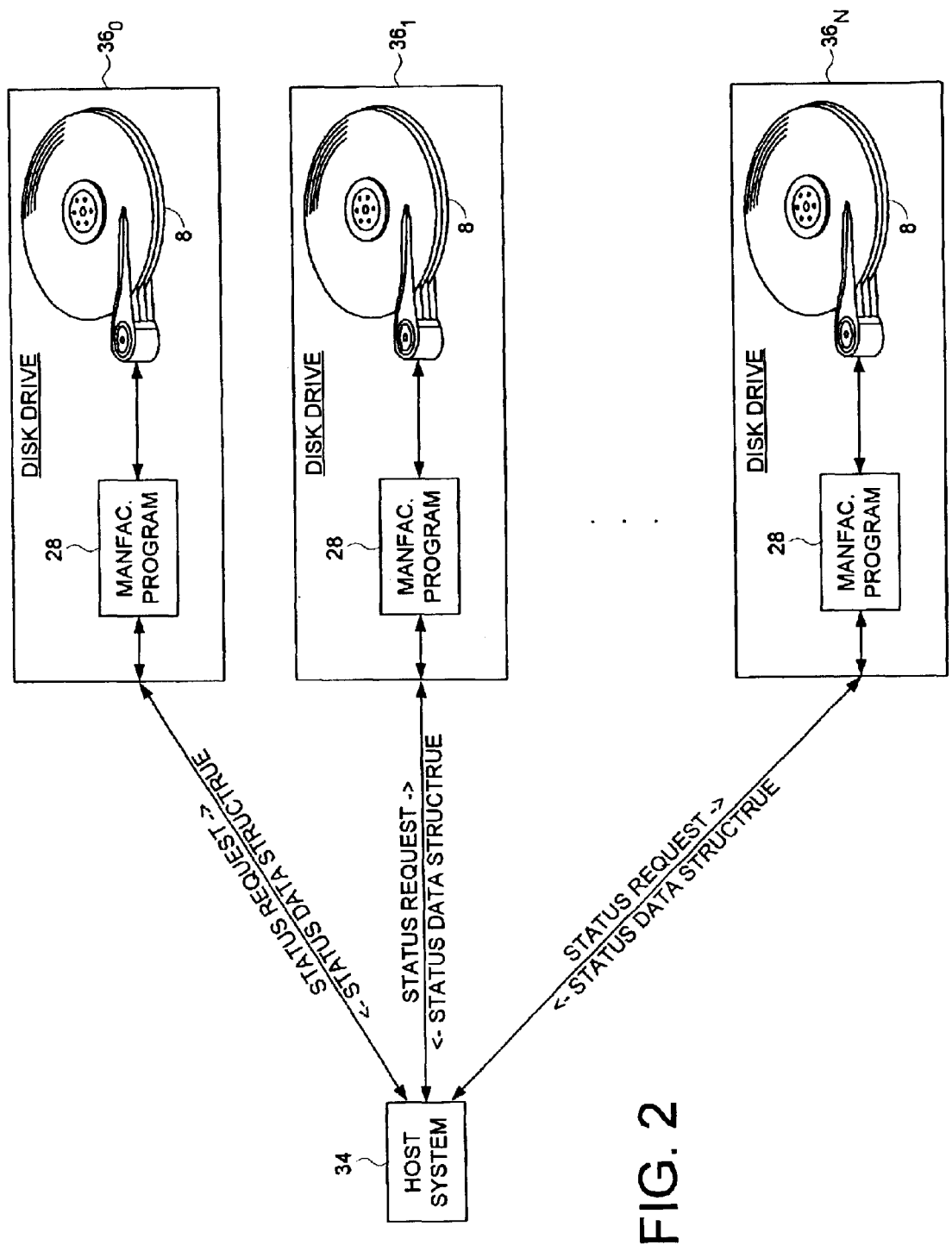
FIG. 2 shows an embodiment wherein a host system monitors a plurality of disk drives executing the manufacturing program, wherein the host system receives a status data structure from each of the disk drives representing an execution status of the manufacturing program.

FIG. 2 shows an embodiment wherein a host system 34 monitors a plurality of disk drives $36_0$–$36_N$ each executing the manufacturing program 28 concurrently, wherein the host system 34 receives a status data structure from each of the disk drives $36_0$–$36_N$ representing an execution status of the manufacturing program. This allows a single host system 34 to monitor a large number of disk drives $36_0$–$36_N$ during the manufacturing process and to take appropriate remedial action if a problem is detected with any one of the disk drives $36_0$–$36_N$.

Figure 3A:
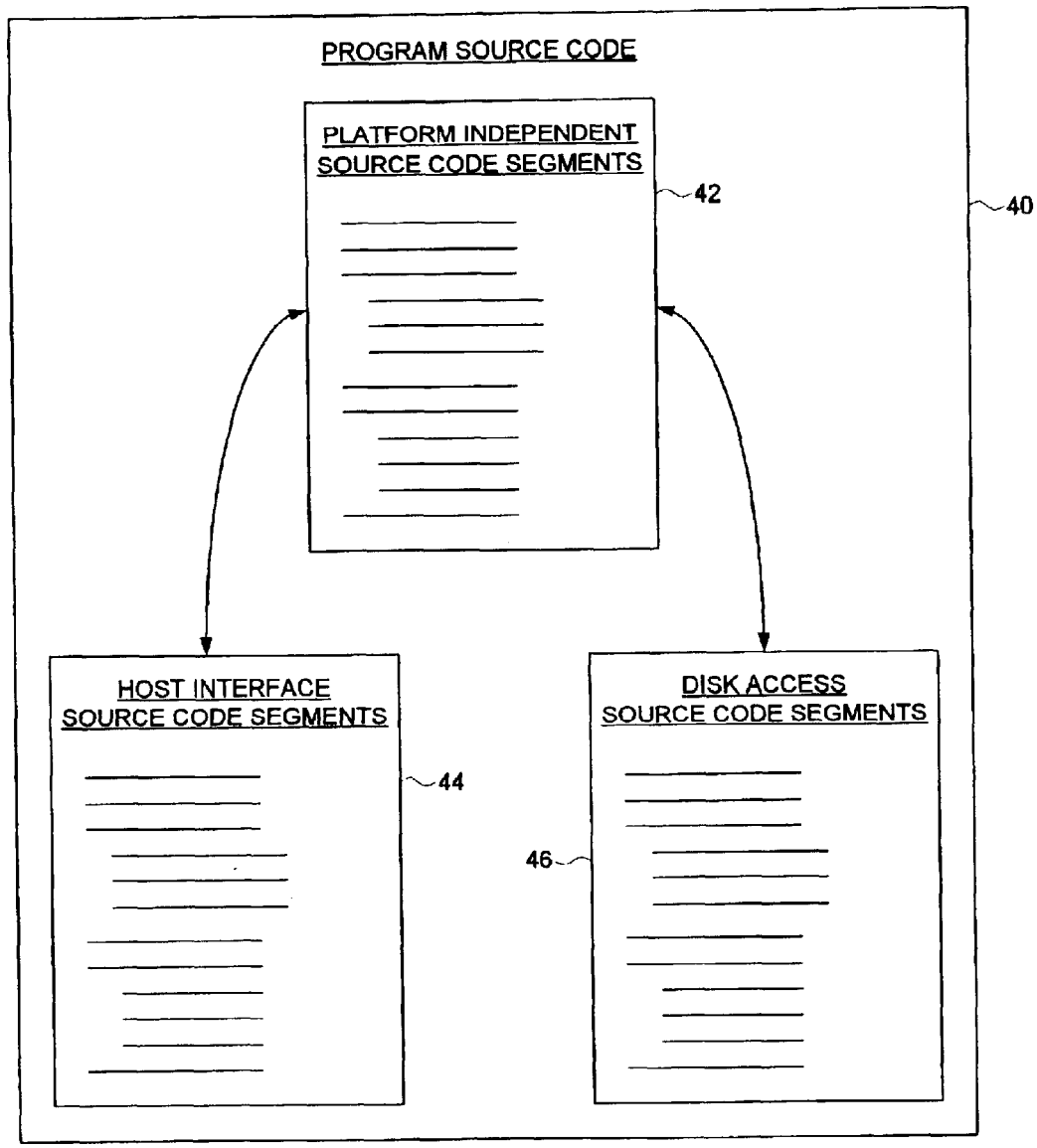
FIG. 3A shows an embodiment wherein program source code comprises platform independent source code segments and platform dependent source code segments for implementing the test program and the manufacturing program.
Figure 3B:
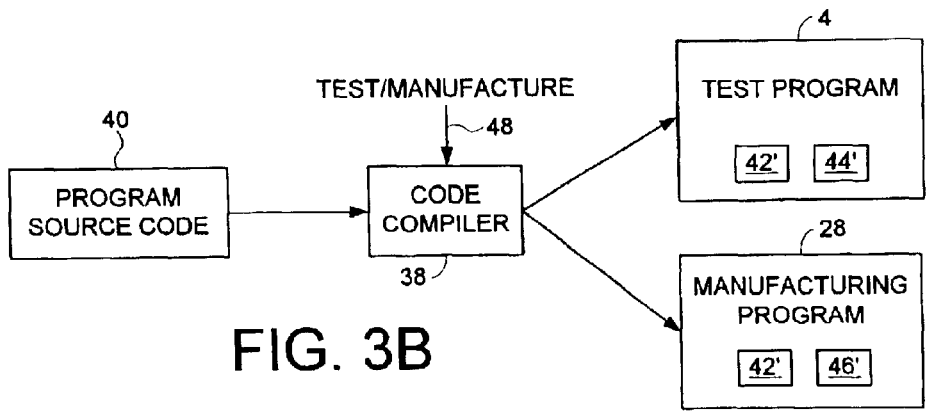
FIG. 3B illustrates compiling the program source code of FIG. 3A in response to a compiler directive to generate the test program or the manufacturing program.

FIGS. 3A and 3B show an embodiment of the present invention wherein a code compiler 38 compiles program source code 40 to generate the test program 4 and the manufacturing program 28. The program source code 40 comprises platform independent source code segments 42 for implementing the platform independent executable code segments executed on both the external test system 2 (FIG. 1A) and the disk drive 24 (FIG. 1C) and therefore "platform independent". The program source code 40 further comprises host interface source code segments 44 for implementing the host interface executable code segments executed on the test system 2, and disk access source code segments 46 for implementing the disk access executable code segments executed on the disk drive 24. The program source code 40 comprises compiler directives for selecting between the host interface source code segments 44 when compiling the program source code 40 to generate the test program 4 and the disk access source code segments 46 when compiling the program source code 40 to generate the manufacturing program 28.

In the embodiment of FIG. 3B, the code compiler 38 receives an input parameter 48 for configuring the compiler directive depending on whether the test program 4 or manufacturing program 28 is being generated. When the compiler directive is configured to generate the test program 4, the code compiler 38 compiles the platform independent source code segments 42 into the platform independent executable code segments 42' and compiles the host interface source code segments 44 into the host interface executable code segments 44'. When the compiler directive is configured to generate the manufacturing program 28, the code compiler 38 compiles the platform independent source code segments 42 the into platform independent executable code segments 42' and compiles the disk access source code segments 46 into the disk access executable code segments 46'.

Figure 4:
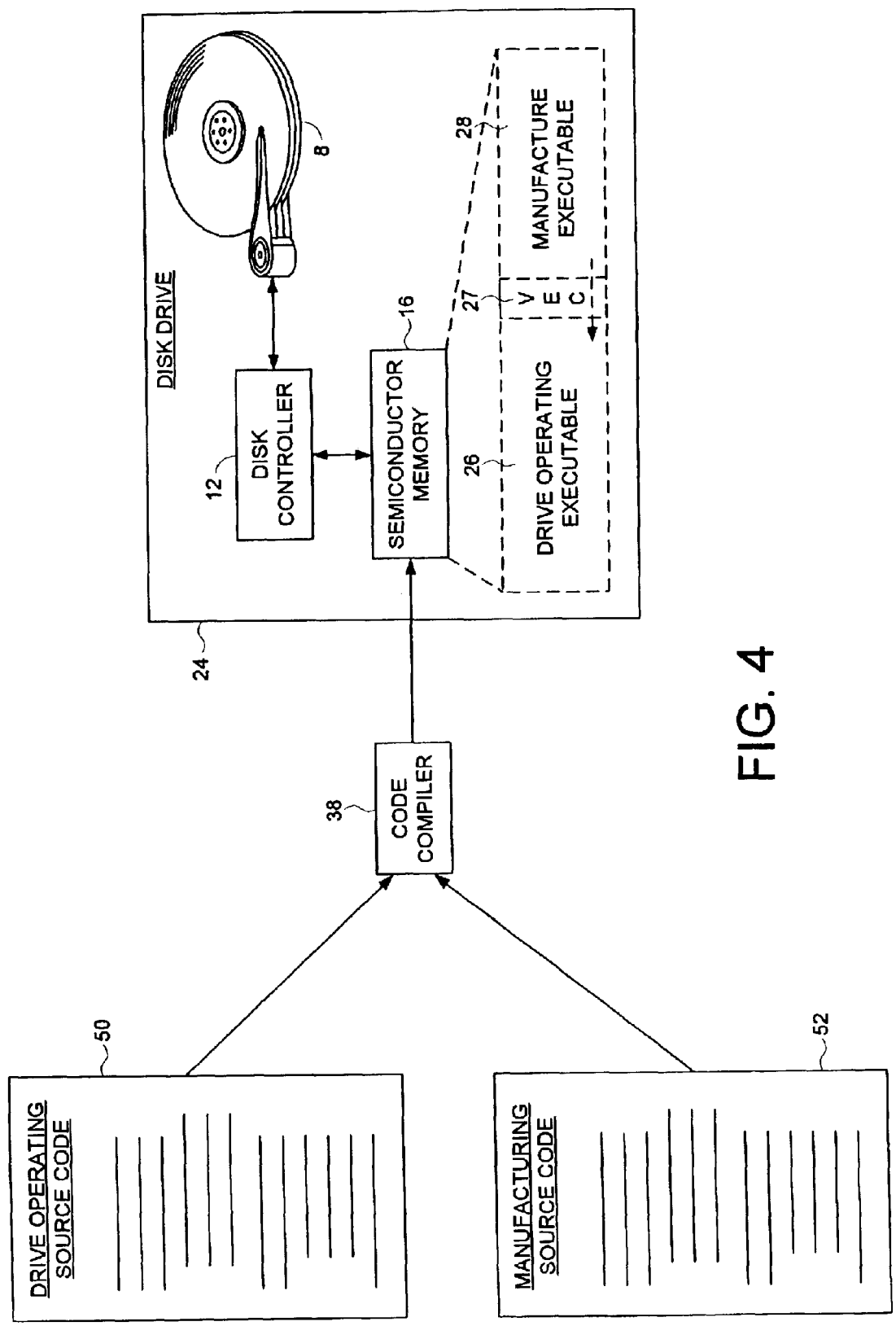
FIG. 4 shows an embodiment wherein the drive operating program and manufacturing program are compiled into executable code segments independently, and a disk drive comprising a semiconductor memory for storing the executable code segments of the drive operating program and the executable code segments of the manufacturing program.

In an alternative embodiment shown in FIG. 4, the code compiler 38 compiles drive operating source code 50 to generate the drive operating program 26 and manufacturing source code 52 to generate the manufacturing program 28. In one embodiment, the manufacturing program 28 is developed by downloading and executing the manufacturing program 28 on the disk drive 24 rather than execute the manufacturing program 28 on an external test system 2 as in FIG. 1A. In this embodiment, the manufacturing source code 52 lacks the host interface code segments 44 of FIG. 3A as well as the compiler directives since it is not necessary to compile source code to run on the external test system 2. As in the embodiments described above, in FIG. 4 the manufacturing program 28 executes disk commands by calling the disk access procedure of the drive operating program 26 through the disk access vector 27.

Figure 5:
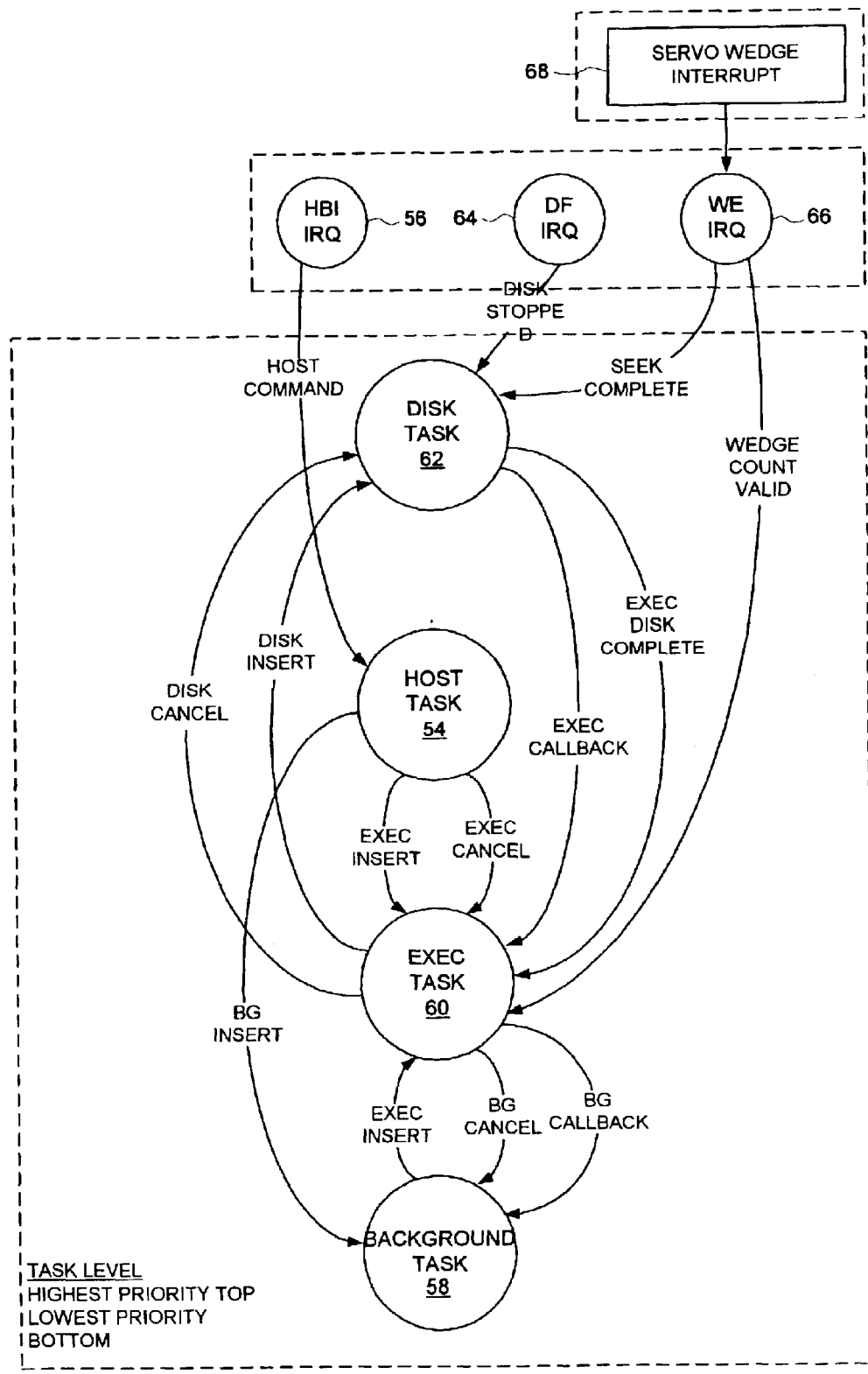
FIG. 5 shows an embodiment of the present invention wherein the drive operating program comprises a preemptive multitasking drive operating program comprising a plurality of tasks of varying priority levels.

In one embodiment, the drive operating program 26 comprises a preemptive multitasking drive operating program comprising tasks having varying priority levels. Referring to FIG. 5, in one embodiment the plurality of tasks comprise at least a host task 54 for receiving the disk commands from the host system through the host interface 14 (via a host bus interface (HBI) interrupt request (IRQ) 56), a background task 58 for executing the manufacturing program 28, and an execution task 60 for arbitrating and executing disk commands received from the host task 54 and the background task 58. Also in the embodiment shown in FIG. 5, the plurality of tasks comprise a disk task 62 for processing disk commands by initiating seek operations and configuring parameters of a read/write channel (not shown). The disk task 62 is responsive to a data formatter IRQ 64 for configuring disk format parameters associated with a format of the disk, including the number and location of defects. A wedge event (WE) interrupt 66 is generated, wherein the disk task 62 is notified when the wedge event interrupt 66 determines a seek operation has completed, and the execution task 60 is notified when the wedge event interrupt 66 determines the head has reached a servo wedge associated with a rotational position optimization (RPO) algorithm. A servo wedge interrupt 68 is generated at each servo wedge 20 (FIG. 1C) for performing time-critical servo processing operations. In the embodiment of FIG. 5, the servo wedge interrupt 68 interfaces with the disk task 62 through the wedge event interrupt 66.

The priority level of the tasks shown in FIG. 5 are from highest priority on top (disk task 62) to lowest priority on the bottom (background task 58). In this manner the execution task 60 gives priority to disk commands received from the host task 54 over disk commands received from the background task 58. This allows the background task 58 to be interrupted (suspended) when a host command is received from the host system. Alter processing the disk command generated by the host task 54, the background task 58 continues the operation it was performing. Further details of a suitable preemptive multitasking drive operating program are disclosed in the above referenced U.S. patent application entitled "A DISK DRIVE EXECUTING A PREEMPTIVE MULTITASKING OPERATING SYSTEM COMPRISING TASKS OF VARYING PRIORITY".

FIG. 6 shows a vector table according to an embodiment of the present invention comprising a plurality of vectors called by the manufacturing program 28 in order to interface with the drive operating program 26. In one embodiment, the address of the vector table is fixed in the semiconductor memory 16 which enables the manufacturing program 28 to access the vector table independent of how the drive operating program 26 configures other segments of the semiconductor memory 16. In one embodiment, the vector table is relocatable wherein the address of the vector table within the semiconductor memory 16 is stored at a fixed address. In yet another embodiment, a software interrupt returns the address of the vector table from the drive operating program 26 to the manufacturing program 28.

The VERSION of the vector table in FIG. 6 identifies the version number of the vector table data structure. The INPUT PARAMETER POINTER stores a pointer to a plurality of input parameters described in greater detail below with reference to FIG. 8. The VSC COMMAND REQUEST stores the disk access vector 27 used by the manufacturing program 28 to call the disk access procedure of the drive operating program 26. The input parameter for the disk access vector 27 is a pointer to a vendor specific command descriptor (VSCD) described below with reference to FIG. 7. The output parameter for the disk access vector 27 is an error code.

The SUSPEND FOR COMPLETION of the vector table stores a suspend for completion vector used by the manufacturing program 28 to call a suspend for completion procedure of the drive operating program 26. This embodiment allows the manufacturing program 28 to process data for a previous disk command while the drive operating program 26 executes a current disk command issued by the manufacturing program 28. When the manufacturing program 28 finishes the data processing for the previous disk command, the manufacturing program 28 calls the suspend for completion procedure which does not return until the drive operating program 26 has finished executing the current disk command. When the suspend for completion procedure returns, the manufacturing program 28 issues a next disk command to the drive operating program 26 and begins data processing for the previous disk command. In one embodiment, an input parameter for the suspend for completion vector is an option to suspend the drive operating program 26 on defect scan data. In this embodiment the suspend for completion procedure does not return to the manufacturing program 28 until the specified defect scan data is available or the drive operating program 26 finishes executing the current disk command.

The PTM STATUS UPDATE of the vector table stores a status update vector used by the manufacturing program 28 to call a status update procedure of the drive operating program 26 for updating a status data structure associated with the manufacturing program 28. The status data structure is transmitted to a host system over the host interface 14 in response to a VSC status request command received by the drive operating program 26 from the host system. Referring to the embodiment shown in FIG. 2, during the manufacturing process the host system 34 sends a VSC status request command to each of the disk drives $36_0$–$36_N$ and each disk drive $36_0$–$36_N$ returns the status data structure.

FIG. 7 shows an embodiment wherein a vendor specific command descriptor (VSCD) is employed by the manufacturing program to execute disk commands (VSC commands) by calling the disk access procedure of the drive operating program 26 through the disk access vector 27 in the vector table of FIG. 6. The FORMAT VERSION identifies the version number of the data structure. The CONTROL FLAGS identify where the VSC command originated. The first three bits identify the interface (ATA or internal), and the last three bits identifies the requester (host system or internal requester). The POINTER TO KEY BUFFER of the VSCD stores a pointer to a key buffer with the requesting key. More information describing key sectors is disclosed in the above referenced U.S. patent application entitled "DISK DRIVE AND METHOD FOR IMPLEMENTING NON-STANDARD DISK-DRIVE COMMANDS ON A SERIAL ATA INTERFACE THAT ONLY SUPPORTS STANDARD ATA DISK-DRIVE COMMANDS". The POINTER TO DATA BUFFER of the VSCD stores a pointer to a data buffer. If the VSCD is configured to execute a VSC command, then the data buffer stores input or output data for the VSC command. If the VSCD is configured to execute a VSC status request, then the data buffer stores the status update data structure. The DATA BUFFER SIZE of the VSCD identifies the size of the data buffer in sectors. The ERROR CODE of the VSCD returns an error code for the VSC command. The COMPLETION COUNT of the VSCD returns the number of sectors/wedges read/written for the VSC command. The SERVO RETRIES of the VSCD returns the number of non-fatal seek errors encountered when seeking to the target track for the VSC command.

In one embodiment, the manufacturing program 28 comprises a plurality of executable files stored on the disk 8 and a sequence control table (SCT) storing control data for selecting and executing the executable files. FIG. 8 shows an example embodiment of a SCT comprising a plurality of test request blocks (TRBs). Each TRB identifies an executable file referred to as a process test module (PTM), wherein each PTM comprises a plurality of different test functions. In the embodiment of FIG. 8, the SCT is stored as a file on the disk and loaded into the semiconductor memory 16 at power-on if the disk drive is configured to execute the manufacturing program 28. The FILE HEADER of the SCT is a standard file header which identifies the SCT file. The TEST POINTER of the SCT identifies the first TRB to execute after the disk drive has been initialized. This facilitates resuming the manufacturing program in the event the disk drive is reset (e.g., due to a power failure). The TRB SIZE of the SCT indicates the size of each TRB (in bytes) which enables the disk controller 12 to delineate the TRBs.

The next entries of the SCT in FIG. 8 comprise the TRB data structures. The PTM ID of the TRB identifies the file ID of the PTM associated with the TRB. In this embodiment, the PTM comprises a plurality of different test functions and the TEST ID of the TRB identifies which test within the PTM to execute. The INPUT PARAMS 1–16 of the TRB identify test-specific input for the test executed. The FLAGS of the TRB indicate the action taken after completing the test (proceed directly to next test or perform a warm start before starting next test). The GOTO ON PASS of the TRB identifies the next TRB to execute if the current test passes. The GOTO ON FAIL of the TRB identifies the next TRB to execute if the current test fails. The GOTO ON TIME of the TRB identifies the next TRB to execute if the current test times out. The TIMER of the TRB indicates the maximum number of seconds before the current test times out. The EXTENDED ERROR CODE of the TRB is the error code returned by the current test. The CURRENT COMMAND of the TRB identifies the last PTM command issued (VSC action, ATA command, or SMART subcommand). The PTM STATUS of the TRB identifies the last status reported by the PTM.

In one embodiment, the manufacturing program 28 executes a defect scan of the disk 8. While executing the defect scan, statistical data is compiled and stored in a disk file. In one embodiment, the test program 4 running on the external test system 2 of FIG. 1A maintains the statistical data related to the defect scan and stores the statistical data in a disk file of the development drive 6. When the disk controller 12 runs the manufacturing program 28 on the disk drive 24 of FIG. 1C, the statistical data related to the defect scan is stored in a disk file of the disk drive 24.

The manufacturing program 28 may implement any suitable operation in addition to the defect scan. The operations may include the following:

RCO —Performance read channel optimization.

Read Pack —Read verifies all sectors of the drive and computes error rates.

Write Pack —Writes to all sectors of drive looking for servo errors.

Servo calibrations —magnate calibration, actuator calibration, set notch filters, etc.

Servo DVTs —Drive verification tests which verify the servo is fully functional on the drive, e.g., bode test.

TSCH—Technical screens looking for specific drive failures modes, such as adjacent track interference (ATI), chip issues, etc.

Included in the appendix is an example embodiment of program source code 40 (FIG. 3A) for implementing the defect scan operation (referred to as ToneScan), including the platform independent source code segments 42 (FIG. 3A), host interface source code segments 44 (FIG. 3A) used by the test program 4 to communicate with the development drive 6 of FIG. 1A, and disk access source code segments 46 (FIG. 3A) used by the manufacturing program 28 to call the disk access procedure of the drive operating program 26. In the source code the manufacturing program 28 is referred to as a process self test (PST). The compiler directive PST MODE is configured by an input parameter 48 (FIG. 3A) to compile the platform independent source code segments 42 and either the host interface source code segments 44 for the test program 4 or the disk access source code segments 46 for the manufacturing program 28. The statistical data related to the defect scan is written to a disk file (via function m_clog.Write(nHead)) by executing a VSC command either by the test program 4 running on the external test system (FIG. 1A) through the host interface executable code segments, or by the manufacturing program 28 running on the disk drive (FIG. 1C) using the disk access vector 27 to call the disk access procedure of the drive operating program 26.

We claim:

1. A disk drive for executing a drive operating program and a manufacturing program during a manufacturing process of the disk drive, wherein an external test system executes a test program comprising platform independent executable code segments and host interface executable code segments, the external test system executes the host interface executable code segments to send disk commands to a development drive, the manufacturing program comprising the platform independent executable code segments of the test program and disk access executable code segments, and the drive operating program comprises a disk access procedure for processing disk commands and a disk access vector for calling the disk access procedure, the disk drive comprising:

(a) a disk;

(b) a head actuated radially over the disk;

(c) a host interface for receiving disk commands from a host system;

(d) a semiconductor memory for storing the drive operating program and the manufacturing program; and (e) a disk controller for:

executing disk commands received over the host interface from the host system by calling the disk access procedure of the drive operating program;

executing the platform independent executable code segments of the manufacturing program; and executing the disk access executable code segments of the manufacturing program to execute disk commands by calling the disk access procedure of the drive operating program through the disk access vector.

2. The disk drive as recited in claim 1, wherein the development drive comprises a disk drive.

3. The disk drive as recited in claim 1, wherein the development drive comprises a program emulating a disk drive.

4. The disk drive as recited in claim 1, further comprising a non-volatile semiconductor memory for storing the manufacturing program.

5. The disk drive as recited in claim 1, wherein the manufacturing program is stored in a file on the disk.

6. The disk drive as recited in claim 1, wherein a host system downloads the manufacturing program to the disk drive.

7. The disk drive as recited in claim 1, wherein a host system sends a host command to the disk drive to begin executing the manufacturing program.

8. The disk drive as recited in claim 7, wherein:

(a) the host system sends at least one input parameter with the host command to the disk drive to begin executing the manufacturing program; and (b) the manufacturing program is responsive to the at least one input parameter.

9. The disk drive as recited in claim 1, wherein the drive operating program for transmitting a status data structure to the host system, the status data structure representing an execution status of the manufacturing program.

10. The disk drive as recited in claim 1, wherein a compiler compiles program source code to generate the test program and the manufacturing program, wherein the program source code comprises:

(a) platform independent source code segments for implementing the platform independent executable code segments;

(b) host interface source code segments for implementing the host interface executable code segments;

(c) disk access source code segments for implementing the disk access executable code segments; and (d) a compiler directive for selecting between the host interface source code segments when compiling the program source code to generate the test program and the disk access source code segments when compiling the program source code to generate the manufacturing program.

11. The disk drive as recited in claim 1, wherein the drive operating program comprises a preemptive multitasking drive operating program comprising tasks having varying priority levels, the tasks comprising at least:

(a) a host task for receiving the disk commands from the host system through the host interface;

(b) a background task for executing the manufacturing program; and (c) an execution task for arbitrating and executing disk commands received from the host task and the background task.

12. The disk drive as recited in claim 11, wherein the execution task gives priority to disk commands received from the host task over disk commands received from the background task.

13. The disk drive as recited in claim 1, wherein:

(a) the drive operating program comprises a status update procedure for updating a status data structure associated with the manufacturing program and a status update vector for calling the status update procedure;

(b) the manufacturing program updates the status data structure by calling the status update procedure through the status update vector; and (c) the status data structure is transmitted to the host system over the host interface.

14. The disk drive as recited in claim 1, wherein:

(a) the drive operating program comprises a suspend for completion procedure for suspending the manufacturing program until the drive operating program finishes processing a current disk command;

(b) the drive operating program comprises a suspend for completion vector for calling the suspend for completion procedure;

(c) the manufacturing program performs data processing for a previous disk command concurrent with the drive operating program executing the current disk command;

(d) after finishing the data processing for the previous disk command, the manufacturing program calls the suspend for completion procedure through the suspend for completion vector; and (e) when the suspend for completion procedure returns to the manufacturing program, the manufacturing program executes a next disk command by calling the disk access procedure of the drive operating program through the disk access vector.

15. The disk drive as recited in claim 1, wherein the manufacturing program comprises:

(a) a plurality of executable files stored on the disk; and (b) a sequence control table comprising control data for selecting and executing the executable files.

16. The disk drive as recited in claim 1, wherein the platform independent executable code segments for:

(a) executing a defect scan of the disk;

(b) maintaining statistical data related to the defect scan; and (c) storing the statistical data in a disk file.

17. The disk drive as recited in claim 16, wherein:

(a) the test program maintains the statistical data related to the defect scan when executed by the external test system and stores the statistical data in a disk file of the development drive; and (b) the manufacturing program maintains the statistical data related to the defect scan when executed by the disk controller and stores the statistical data in a disk file of the disk drive.

18. A disk drive for executing a drive operating program and a manufacturing program during a manufacturing process of the disk drive, the disk drive comprising:

(a) a disk;

(b) a head actuated radially over the disk;

(f) a host interface for receiving disk commands from a host system;

(c) a semiconductor memory for storing executable code segments of the drive operating program and executable code segments of the manufacturing program; and (d) a disk controller for executing the executable code segments of the drive operating program and the executable code segments of the manufacturing program, wherein:

the drive operating program comprises a disk access procedure for processing disk commands received over the host interface from the host system and a disk access vector for calling the disk access procedure; and the manufacturing program executes disk commands by calling the disk access procedure through the disk access vector.

19. The disk drive as recited in claim 18, further comprising a non-volatile semiconductor memory for storing the manufacturing program.

20. The disk drive as recited in claim 18, wherein the manufacturing program is stored in a file on the disk.

21. The disk drive as recited in claim 18, wherein a host system downloads the manufacturing program to the disk drive.

22. The disk drive as recited in claim 18, wherein a host system sends a host command to the disk drive to begin executing the manufacturing program.

23. The disk drive as recited in claim 22, wherein:

(a) the host system sends at least one input parameter with the host command to the disk drive to begin executing the manufacturing program; and (b) the manufacturing program is responsive to the at least one input parameter.

24. The disk drive as recited in claim 18, wherein the drive operating system transmits a status data structure to the host system, the status data structure representing an execution status of the manufacturing program.

25. The disk drive as recited in claim 18, wherein the drive operating program comprises a preemptive multitasking drive operating program comprising tasks having varying priority levels, the tasks comprising at least:

(a) a host task for receiving the disk commands from the host system through the host interface;

(b) a background task for executing the manufacturing program; and (c) an execution task for arbitrating and executing disk commands received from the host task and the background task.

26. The disk drive as recited in claim 25, wherein the execution task gives priority to disk commands received from the host task over disk commands received from the background task.

27. The disk drive as recited in claim 18, wherein:

(a) the drive operating program comprises a status update procedure for updating a status data structure associated with the manufacturing program and a status update vector for calling the status update procedure;

(b) the manufacturing program updates the status data structure by calling the status update procedure through the status update vector; and (c) the status data structure is transmitted to the host system over the host interface.

28. The disk drive as recited in claim 18, wherein:

(a) the drive operating program comprises a suspend for completion procedure for suspending the manufacturing program until the drive operating program finishes processing a current disk command;

(b) the drive operating program comprises a suspend for completion vector for calling the suspend for completion procedure;

(c) the manufacturing program performs data processing for a previous disk command concurrent with the drive operating program executing the current disk command;

(d) after finishing the data processing for the previous disk command, the manufacturing program calls the suspend for completion procedure through the suspend for completion vector; and (e) when the suspend for completion procedure returns to the manufacturing program, the manufacturing program executes a next disk command by calling the disk access procedure of the drive operating program through the disk access vector.

29. The disk drive as recited in claim 18, wherein the manufacturing program comprises:

(a) a plurality of executable files stored on the disk, and (b) a sequence control table comprising control data for selecting and executing the executable files.

30. The disk drive as recited in claim 18, wherein the manufacturing program comprises executable code segments for:

(a) executing a defect scan of the disk;

(b) maintaining statistical data related to the defect scan; and (c) storing the statistical data in a disk file on the disk.

* * * * *